US006118911A

United States Patent [19]

Bennett et al.

[11] Patent Number: 6,118,911

[45] Date of Patent: Sep. 12, 2000

[54] WAVEGUIDE SWITCH MATRIX USING JUNCTIONS MATCHED IN ONLY ONE STATE

[75] Inventors: Richard L. Bennett, Torrance; David Kershner, Los Angeles, both of Calif.

[73] Assignee: Hughes Electronics Corporation, El Segundo, Calif.

[21] Appl. No.: 09/160,807

[22] Filed: Sep. 25, 1998

[51] Int. Cl.[7] .......... G02B 6/26

[52] U.S. Cl. .......... 385/17; 385/15; 385/16; 385/20; 385/24

[58] Field of Search .......... 385/15, 16, 17, 385/20, 24, 18, 21, 22

[56] References Cited

U.S. PATENT DOCUMENTS

| | | | |
|---|---|---|---|
| 4,011,543 | 3/1977 | Soref et al. | 385/17 X |
| 4,153,329 | 3/1979 | Gillette | 385/17 X |
| 4,681,397 | 7/1987 | Bhatt | 385/17 X |
| 4,846,542 | 7/1989 | Okayama et al. | 385/17 X |
| 5,175,777 | 12/1992 | Bottle | 385/17 |
| 5,581,643 | 12/1996 | Wu | 385/17 |
| 5,960,131 | 9/1999 | Fouquet et al. | 385/17 |

*Primary Examiner*—Brian Healy
*Attorney, Agent, or Firm*—Terje Gudmestad; M. W. Sales

[57] ABSTRACT

A waveguide switch matrix is disclosed. The switch matrix includes a number of input waveguides that may be selectably connected to a number of output waveguides. A switch apparatus is provided at the intersection of each input waveguide and each output waveguide. The switch apparatus includes probes inserted into both the input waveguide and the output waveguide. The probes are connected through a switch arrangement. When a particular input waveguide is to be coupled to a particular output waveguide, the switch arrangement between the probes of the waveguides is closed to provide a signal path for the electromagnetic energy.

8 Claims, 3 Drawing Sheets

WAVEGUIDE SWITCH MATRIX USING JUNCTIONS MATCHED IN ONLY ONE STATE

BACKGROUND OF THE INVENTION (a) Technical Field of the Invention

The present invention relates generally to waveguide arrays. More particularly, the present invention relates to a waveguide array wherein the input waveguides are selectively coupled to the output waveguides by switches and the aperture used to connect to the waveguide is matched only when the input waveguide is disconnected from the output waveguides.

(b) Description of Related Art

Waveguides are often used for the transmission of high-frequency signals, such as signals in the Ku band. In communications application, it is often desirable to connect a particular input waveguide to one of several different output waveguides. This allows for easier signal passing and handling functions.

In the past, this signal switching has been performed by using a microwave switch matrix (MSM) constructed from fully integrated striplines. In the MSM, each input waveguide is split into two branch striplines. A switch is used to control which of the branch striplines will be used to carry the signal. These branch striplines are further split by additional hybrids each having a switch. This splitting process continues until there are as many branches as there are output waveguides. One branch from each input waveguide is then connected to each output waveguide through proper switch selection of the stripline hybrid.

As the number of output waveguides increases, the number of hybrids, branches, and switches grows rapidly. Each of these hybrids adds 3 dB of loss to the switching system. Further, transmission line losses increase with increasing frequency. Additionally, the circuit board layout area required for the MSM grows quickly as the number of branches grows.

Accordingly, there is a need for a waveguide switch matrix that has a low switching mechanism reactance. Additionally, it is desired that the matrix require a relatively small physical layout area that does not increase exponentially as the number of outputs increases.

SUMMARY OF THE INVENTION

The present invention is an apparatus for selectably connecting one of a number of inputs to one of a number of outputs. The apparatus includes a number of inputs, a number of outputs, and a number of switch junctions for connecting the inputs to the outputs. The number of switches in the apparatus is equal to the product of the number inputs and the number of outputs.

Each switch junction includes a first probe disposed within an input waveguide, a second probe disposed within an output waveguide, and a switching apparatus connecting the first and second probes. The switching apparatus includes a first controller circuit for controlling a first switch and a second controller circuit for controlling a second switch. The first and second switches are connected by first and second connectors. The probes may be inserted into the waveguide either through the wide dimension or through the narrow dimension.

An alternative embodiment the first and second switches may be replaced by a single switch and the first and second controller circuits may be replaced by a single controller circuit.

The invention itself, together with further objects and attendant advantages, will best be understood by reference to the following detailed description, taken in conjunction with the accompanying drawings.

DESCRIPTION OF THE PREFERRED EMBODIMENT

The present invention is a microwave switch matrix for use in a communications system. The switch matrix allows routing of input signals from an input waveguide to any one of a number of output waveguides. That is, the switch matrix may accept inputs from a number of different feeds at various locations and transfers the information to another waveguide for routing to another geographical location or to circuitry that further processes the signals.

Figure 1:
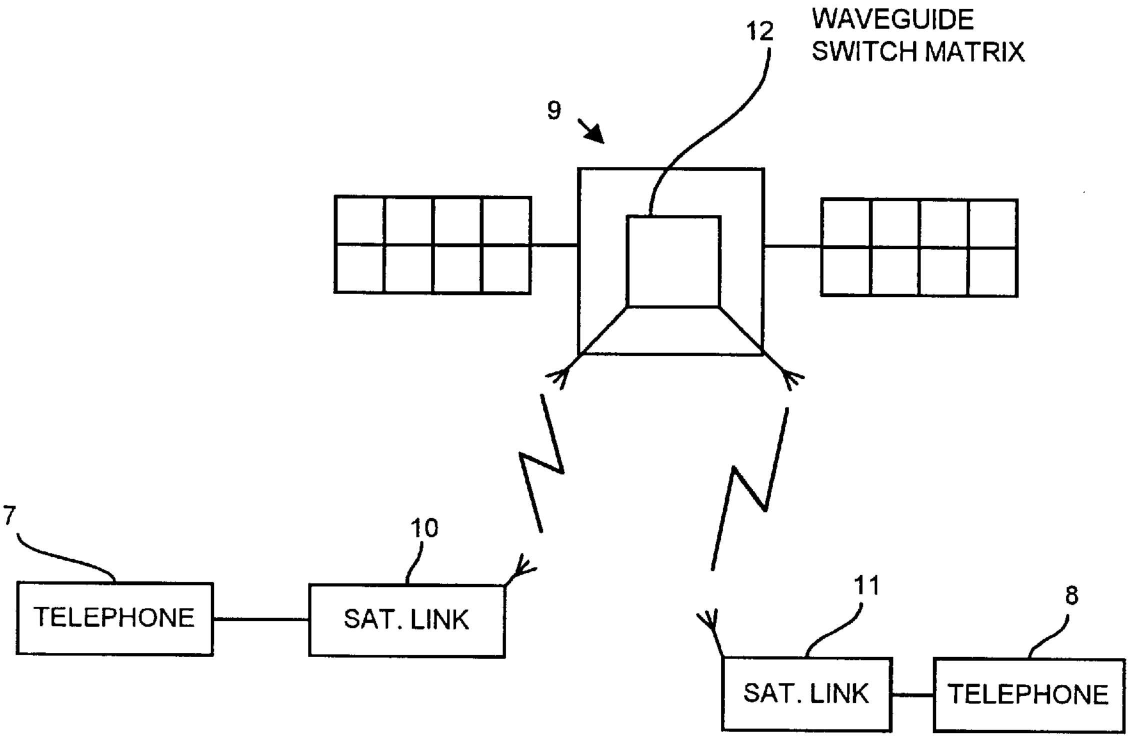
FIG. 1 illustrates a satellite telecommunications system using the present invention.

FIG. 1 shows a satellite telecommunications system capable of employing the present invention. The system shown in FIG. 1 is applicable to satellite telecommunications. However, it should be understood that the present invention is applicable to a wide variety of communications systems other than strictly satellite telecommunications.

Referring again to FIG. 1, users at remotely disposed locations use telephones 7, 8 to communicate with one another via satellite 9. For example, a user using a telephone 7 may converse with a user at another telephone 8. As the user at telephone 7 speaks, her voice may be transferred, to a satellite link station 10. In a known manner, the satellite link station 10 encodes and upconverts the user's voice for broadcast to a communications satellite 9, which in turn relays the signal to a user at the other telephone 8 via a satellite link station 11. The satellite 9 may use a waveguide switch matrix 12 to transfer the received electromagnetic signal from an input waveguide to an output waveguide. The input and output waveguides may correspond to different geographical locations to which the antennas on the satellite point. That is, the switch matrix may be used to route signals between two antennas that point at fixed locations. Alternatively, the switch matrix may be used to route received signals to circuitry for further processing. The satellite may downlink the communication signal to an appropriate satellite link station 11. The satellite link 11 station performs the function of recovering the information originally sent from the first satellite link station 10. The satellite link station 11 performs the function of converting the signals to an appropriate format for use by the telephone 8 located at the second location.

Figure 2:
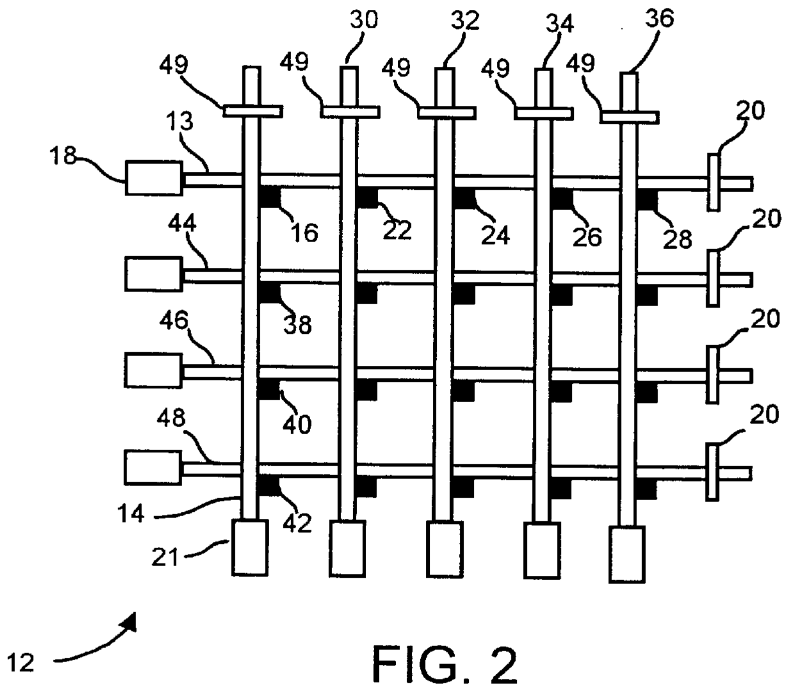
FIG. 2 illustrates a waveguide matrix having four inputs and five outputs.

FIG. 2 depicts a waveguide switch matrix 12 of the present invention, having four input waveguides and five output waveguides. An input waveguide 13 is connected to an output waveguide 14 by a switch junction 16. At the beginning of the input waveguide 13 is an input isolator 18, and at the end of the input waveguide 13 is a resistive load 20. The input isolator 18 may be composed of a ferrite material that allows signals to pass into the input waveguide 13 from an external source, but prevents signals from passing out of the input waveguide 13 through the input isolator 18.

The switch junction 16 selectively connects the input waveguide 13 to the output waveguide 14, which includes an output isolator 21. Other switch junctions 22, 24, 26, 28 are used to selectively connect the input waveguide 13 to other output waveguides 30, 32, 34, 36. The input waveguide 13 may only be connected to one output waveguide at any given time. Thus, if the switch junction 16 is closed, the remaining switch junctions 22–28 relevant to the input waveguide 13 are all open. Similarly, only one input waveguide is ever connected to a particular output line. Thus, if the switch junction 16 is closed, switch junctions 38, 40, 42 that connect to the other input waveguides 44, 46, 48 to the output waveguide 14 are all open.

In one particular mode of operation of the waveguide matrix 12, a signal enters the input waveguide 13 through the input isolator 18. The switch junction 16 electrically connects the input waveguide 13 to the output waveguide 14. In this mode the input waveguide 13 is not coupled to any other output waveguide and the output waveguide 14 is not coupled to any other input waveguide. Thus, the input signal propagates through the input isolator 18 into the input waveguide 13, through the switch 16 and into the output waveguide 14. The signal propagates through the output isolator 21 and further on to any other desired circuitry.

The coupling between the switch and the input waveguides is not perfect and some electromagnetic energy will propagate in the input waveguide past a closed switch. To eliminate reflections from the uncoupled energy, resistive loads are connected on the end of each input waveguide. Likewise, when energy is coupled from a switch to an output waveguide half of the energy will propagate toward the output isolator on the output waveguide, and half of the energy will propagate toward the opposite end of the output waveguide. To prevent reflections from energy that propagates toward the opposite end of an output waveguide, resistive loads 49 are placed on the end of each waveguide opposite from the output isolators.

Figure 3:
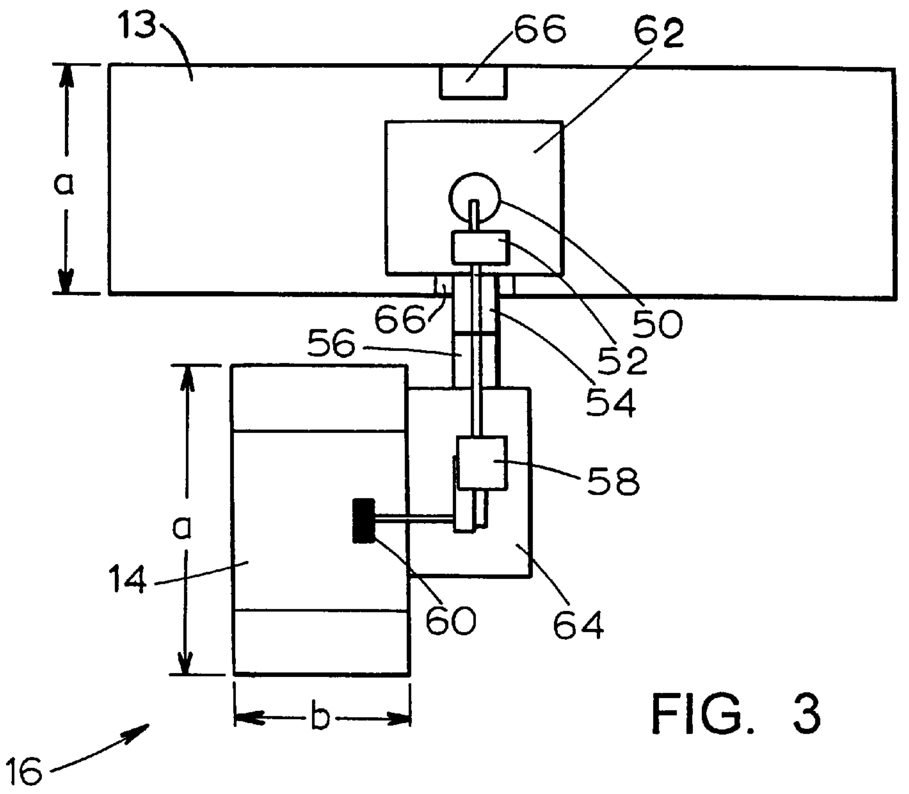
FIG. 3 is a detailed diagram showing a switch junction of the present invention.

FIG. 3 shows the switch junction 16 in more detail. A first probe 50 is connected to the input waveguide 13. The probe 50 is electrically connected to a first switch 52, which is further connected to a first connection end 54. The switch 52 may be any switching device, such as a transistor, a diode, or a mechanical switch. The first connector 54 abuts and is connected to a second connector 56. A second switch 58 is electrically connected to both the second connector 56 and a second probe 60. The use of two switches 52, 58 increases the electrical isolation between the input waveguide 13 and the output waveguide 14. The use of the connectors 54, 56 allow waveguides to be easily added to or removed from the switch matrix 12. A first control circuit 62 directs the operation of the first switch 52, and a second control circuit 64 directs the operation of the second switch 58.

When it is desired to electrically connect the input waveguide 13 to the output waveguide 14, the first and second control circuits 62, 64 direct the switches 52, 58 to close. This creates an electrical connection from the first probe 50, through the first switch 52 and the connectors 54, 56, through the second switch 58 to the second probe 60.

Figure 4:
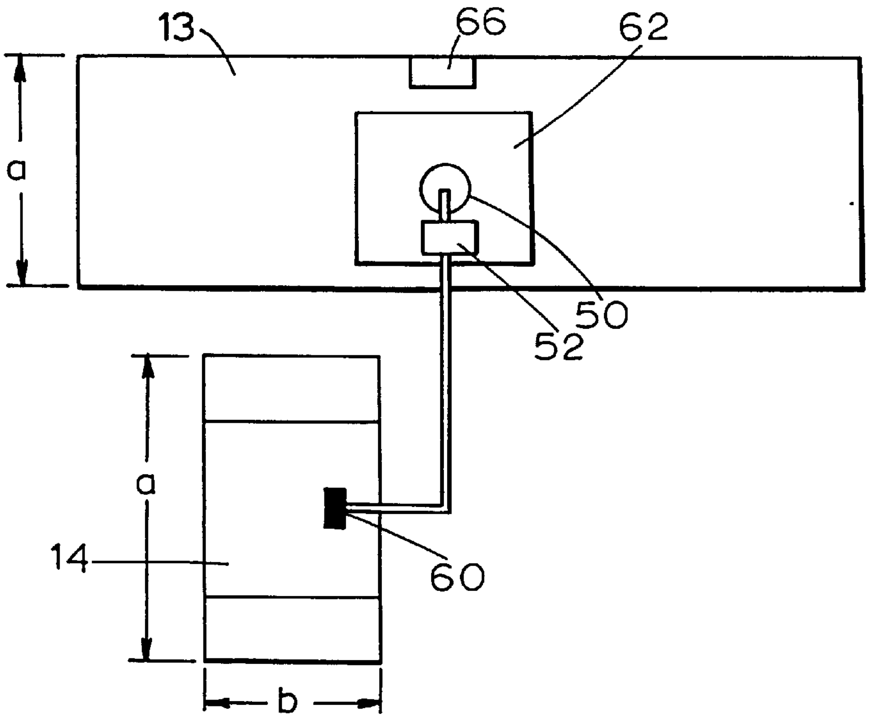
FIG. 4 is a detailed diagram showing an alternative embodiment of a switch junction of the present invention.

Alternatively as shown in FIG. 4, the first and second switches 52, 58 and the first and second control circuits 62, 64 may be replaced by a single switch 52 controlled by a single control circuit 62. The functionality of the embodiment shown in FIG. 4 is identical to the functionality disclosed in conjunction with FIG. 3 except for the fact that when the input waveguide 13 is to be connected to the output waveguide 14 the single control circuit 62 actuates the single switch 52 to connect the waveguides 13, 14.

The first probe 50 adds a capacitive impedance to the input waveguide 13. A capacitive impedance reduces bandwidth of operation by degrading the match of the input and output waveguides 13, 14. To counteract this capacitive effect, an inductive iris 66 is created in the input waveguide 13. The inductive iris 66 may be created by adding conductive posts in the waveguide. The inductive iris 66 is designed such that the magnitude of the inductive impedance matches the magnitude of the capacitive impedance of the probe 50 at a design frequency. A similar inductive iris is located on the output waveguide 14 to counteract the capacitive effect of the second probe 60. The use of inductive irises is well known in the art. Likewise, it is well known in the waveguide art to refer to a waveguide having end dimensions of a×b as shown in FIG. 3, wherein a is the width of the waveguide and b is the height of the waveguide.

Figure 5:
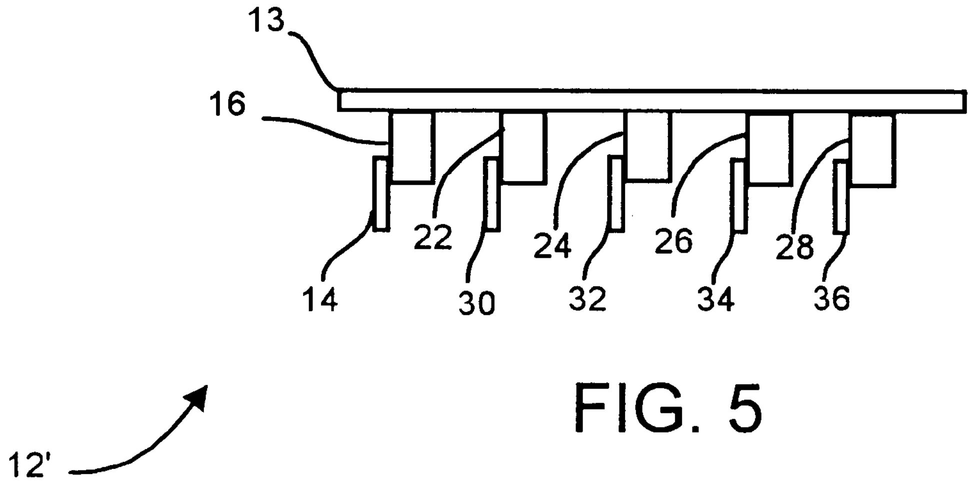
FIG. 5 illustrates a switch matrix of the present invention wherein the "b" side of an input waveguide is coupled to the "a" sides of the output waveguides.
Figure 6:
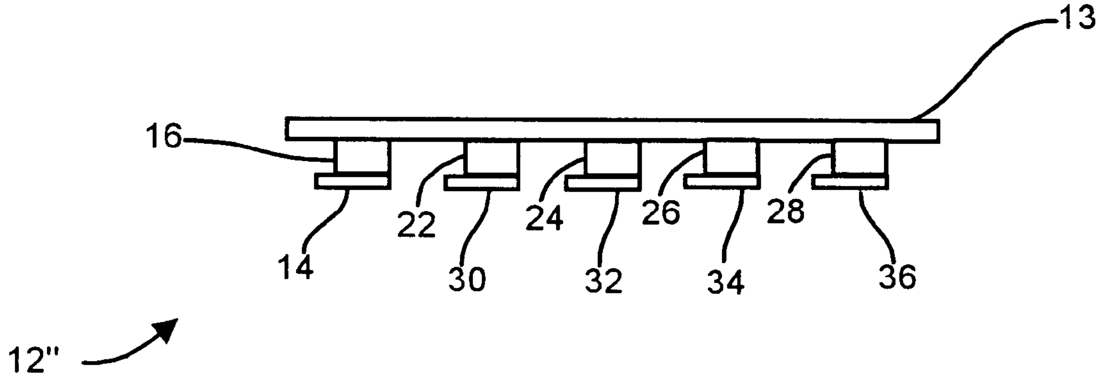
FIG. 6 illustrates a switch matrix of the present invention wherein the "a" side of an input waveguide is coupled to the "a" sides of the output waveguides.
Figure 7:
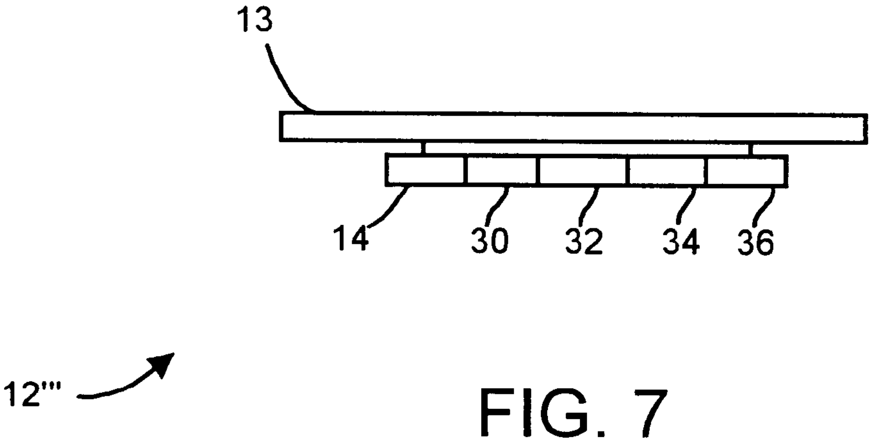
FIG. 7 illustrates an alternate embodiment wherein the "a" side of the input waveguide is coupled to the "a" sides of the output waveguides and the "b" sides of the output waveguides are directly adjacent to one another.

FIGS. 5–7 depict alternative embodiments of the waveguide switch matrix 12 shown in FIG. 2. In FIG. 5, a waveguide switch matrix 12' is constructed wherein the “b” sides of the input waveguides are coplanar, and the “b” sides of the output waveguides are coplanar. Switch junctions 16, 22, 24, 26, and 28 connect the “b” side of the input waveguide 13 to the “a” side of the output waveguides 14, 30, 32, 34, and 36.

In FIG. 6, a switch matrix 12" is constructed wherein the “a” sides of the input waveguides are coplanar and the “a” sides of the output waveguides are coplanar. Switch junctions 16, 22, 24, 26, and 28 connect the “a” side of input waveguide 13 to the “a” side of output waveguides 14, 30, 32, 34, 36. Switch matrix 12" is advantageous over switch matrix 12' of FIG. 5 in that switch matrix 12" requires less vertical space to be implemented because the waveguides are connected by their “a” sides.

FIG. 7 illustrates a third embodiment of a switch matrix 12'''. In FIG. 7, the output waveguides 14, 30, 32, 34, and 36 are positioned directly adjacent to one another so that their “b” sides are connected. This allows the output waveguides 14, 30, 32, 34, and 36 to be constructed of a unitary piece of material, which reduces the space required to construct the matrix as well as the cost to manufacture the matrix 12'''.

In all of the switch matrices, it is necessary to space the switch junctions 16, 22, 24, 26, and 28 at odd multiples of quarter wavelengths of the input signal. As can be appreciated by those skilled in the art, this configuration best matches the impedance seen by the input signal due to the switch junctions 16, 22, 24, 26, and 28. Odd multiples of one quarter wavelength minimizes the cumulative effects of residual reactances at each of the switch junctions 16, 22, 24, 26, and 28.

The present invention provides a way of connecting one of a number of waveguide inputs to one of a number of waveguide outputs. The invention eliminates the need for microstrip switching hybrids, which have very high losses at frequencies above the Ku band. The waveguide runs are modular, passive, and highly reliable. The active elements used in switching are modular and may be easily tested and replaced. Additionally, input and output waveguides may be added to the present invention without performance degradation from additional reactance added by additional components.

As can be surmised by one skilled in the art, there are many more configurations of the present invention that may be used other than the ones presented herein. For example, the input and output waveguides may be connected by their "b" sides or, their "a" sides or any permutation of the "b" side and "a" side. Additionally, the input waveguides as well as the output waveguides may be machined together. The present invention is not limited to linking waveguides. Specifically, a coaxial output could be used to create a 1×N configuration. It is therefore intended that the foregoing detailed description be regarded as illustrative rather than limiting and that it be understood that it is the following claims, including all equivalents, that are intended to define the scope of this invention.

What is claimed is:

1. An apparatus for selectably connecting one of a plurality of inputs to one of a plurality of outputs, said apparatus comprising:

a plurality of inputs;

a plurality of outputs; and a plurality of switch junctions for selectably connecting each input to each output, where the number of switch junctions used in said apparatus is equal to the number of inputs multiplied by the number of outputs wherein said switch junctions include: a first probe disposed in one of said plurality of inputs; a second probe disposed in one of said plurality of outputs; and a switching apparatus connecting said first probe and said second probe.

2. The apparatus of claim 1, wherein said switching apparatus comprises a control circuit controlling a switch.

3. The apparatus of claim 1, wherein said switching apparatus comprises a control circuit controlling a switch.

4. The apparatus of claim 1, wherein said plurality of inputs and said plurality of outputs comprise waveguides, said waveguides having a width and a height.

5. The apparatus of claim 4, wherein said first probe is disposed within said input waveguide such that said first probe is inserted through said width of said waveguide.

6. The apparatus of claim 4, wherein said first probe is disposed within said input waveguide such that said first probe is inserted through said height of said input waveguide.

7. The apparatus of claim 4, wherein said second probe is disposed within said output waveguide such that said second probe is inserted through said width of said output waveguide.

8. The apparatus of claim 4, wherein said first probe is disposed within said input waveguide such that said first probe is inserted through said height of said output waveguide.

* * * * *